(12) United States Patent
Middleton et al.

(10) Patent No.: US 9,868,913 B2
(45) Date of Patent: Jan. 16, 2018

(54) PROCESSING DIESEL FUEL FROM WASTE OIL

(71) Applicant: HD Petroleum Inc., Winnipeg (CA)

(72) Inventors: Orville Middleton, Winnipeg (CA); Bernhard G. Habicht, Winnipeg (CA); Todd Habicht, Winnipeg (CA); John Winram, Winnipeg (CA)

(73) Assignee: HD Petroleum Inc., Winnipeg, MB (CA)

( * ) Notice: Subject to any disclaimer, the term of this patent is extended or adjusted under 35 U.S.C. 154(b) by 88 days.

(21) Appl. No.: 14/779,611

(22) PCT Filed: Mar. 17, 2014

(86) PCT No.: PCT/CA2014/050277
§ 371 (c)(1),
(2) Date: Sep. 24, 2015

(87) PCT Pub. No.: WO2014/153652
PCT Pub. Date: Oct. 2, 2014

(65) Prior Publication Data
US 2016/0053190 A1 Feb. 25, 2016
US 2017/0145321 A9 May 25, 2017

Related U.S. Application Data

(63) Continuation-in-part of application No. 14/127,752, filed as application No. PCT/CA2012/000913 on Oct. 3, 2012, now Pat. No. 9,359,559.

(60) Provisional application No. 61/806,164, filed on Mar. 28, 2013, provisional application No. 61/542,730, filed on Oct. 3, 2011.

(51) Int. Cl.
*C10G 31/09* (2006.01)
*C10G 33/00* (2006.01)
*C10G 55/04* (2006.01)
*C10G 9/00* (2006.01)
*C10G 7/00* (2006.01)
*C10L 1/08* (2006.01)

(52) U.S. Cl.
CPC ............ *C10G 55/04* (2013.01); *C10G 7/00* (2013.01); *C10G 7/006* (2013.01); *C10G 9/002* (2013.01); *C10G 31/09* (2013.01); *C10G 33/00* (2013.01); *C10L 1/08* (2013.01); *C10L 2200/0446* (2013.01); *C10L 2270/026* (2013.01); *C10L 2290/06* (2013.01); *C10L 2290/543* (2013.01); *C10L 2290/547* (2013.01)

(58) Field of Classification Search
CPC ........ C10G 7/006; C10G 9/002; C10G 31/09; C10G 33/04; C10G 55/04
See application file for complete search history.

(56) References Cited

U.S. PATENT DOCUMENTS

| | | | | |
|---|---|---|---|---|
| 5,888,402 A * | 3/1999 | Hommeltoft | .......... | C10G 53/08 210/690 |
| 6,024,880 A * | 2/2000 | Ciora, Jr. | ............... | B01D 61/14 208/179 |
| 6,132,596 A * | 10/2000 | Yu | .................... | C10M 175/0025 208/130 |
| 9,359,559 B2 * | 6/2016 | Middelton | .............. | C11B 3/001 |

* cited by examiner

*Primary Examiner* — Randy Boyer
(74) *Attorney, Agent, or Firm* — Adrian D. Battison; Ade & Company Inc.; Michael R. Williams

(57) ABSTRACT

There is disclosed a system and method for processing diesel fuel from petroleum-based waste oil on a small scale compared to conventional methods for re-refining waste oil to a valuable product. In an embodiment, the method comprises dehydrating waste oil to remove water from the waste oil, and operating a vertical cylindrical reactor to induce pyrolysis of the dehydrated waste oil and convert it into a hydrocarbon vapor phase. The hydrocarbon vapor derived from pyrolysis is condensed and distilled using a distillation tower to produce diesel fuel, heavy liquid hydrocarbon, light liquid hydrocarbon and light hydrocarbon vapor. A filtering step cleans the processed diesel fuel to obtain a clean diesel fuel product.

24 Claims, 6 Drawing Sheets

PROCESSING DIESEL FUEL FROM WASTE OIL

This application is the national stage of PCT/CA2014/050277 filed Mar. 17, 2014 and claims the benefit under 35 USC 119 (e) of Provisional Application 61/806,164 filed Mar. 28, 2013, and is a continuation in part of application Ser. No. 14/127,752 filed Dec. 19, 2013 which is a 371 of international PCT/CA2012/000913 field Oct. 3, 2012 and claims the benefit under 35 USC 119 (e) of Provisional Application 61/542,730 filed Oct. 3, 2011.

The present invention relates generally to the field of re-refining or reprocessing petroleum-based waste products, and more particularly to an apparatus and method for processing diesel fuel from waste oil in a micro-scale processing facility.

The present invention also pertains generally to thermal conversion of waste oil in a vertical cylindrical reactor but more particularly it relates to an apparatus or device for pyrolytic or thermal conversion of waste oil where waste oil is heated and decomposed into smaller hydrocarbons inside a pyrolysis device, comprising a reactor, a heater shell and a burner mechanism.

BACKGROUND

Historically, re-refining waste oil has been difficult to undertake economically unless conducted on a large scale. While complex large scale processing facilities for recycling waste oils and converting them to reusable products are known, due to the expense of the known technologies, these large-scale capital intensive process facilities are required to draw on large geographical catchment areas for waste oil feedstock. Due to feedstock, transportation, and logistics costs, which may quickly consume any economies of scale benefit, large scale processing facilities are only viable in large regional markets able to supply sufficient quantities of waste oil feedstock within a reasonable distance. In smaller and developing markets where such large scale operations are not sustainable, it has not been possible to economically re-refine waste oils with known technology.

Current practices in markets too small to support conventional re-refining facilities include burning waste oil as a dirty fuel for industrial use or space heating, or alternatively disposing of large volumes of waste oil in potentially environmentally inappropriate ways. These practices may result in a discharge of air borne pollutants, or contamination of soils and groundwater. Whichever practice is used, the resulting water, soil, and/or air pollution contains many of the harmful chemicals found in waste oil, which may expose plants, animals and humans to their toxic effects. Therefore, in many jurisdictions around the world waste oil is mostly classified as a hazardous waste material.

What is needed is a solution to recycle these waste oils in a more environmentally friendly and economically viable manner. The ideal solution is an economically viable micro scale waste oil re-refining or conversion process operable with feedstock obtained from a smaller population area. Of course, an essential and key component of such a re-refining/conversion process is a cracking vessel or reactor where waste oil is thermally cracked and decomposed into diesel fuel range hydrocarbons. The existing technologies and processes available for decomposing waste oil includes re-refining process and reactors of various capacities, shapes, designs and with differing operating methods. However, the existing technologies have failed to address the needs for re-refining in small population centres. They have failed to create a continuous and economically viable process. These re-refineries have also failed to address low yield and the formation of coke sludge in the processes.

The present method and device is built to overcome precisely these obstacles, conducting pyrolysis of waste oil and converting to diesel fuel range hydrocarbons in a miniaturized scale that is commercially viable. The invention allows for the continuous pyrolysis of smaller amounts of feedstock to be converted into valuable petroleum distillates. This method and device reduces the cost of waste oil re-refining. It achieves this through an optimum residence time under sub atmospheric pressures during the pyrolysis reaction. The process does not use any catalyst and has almost no coke formation inside the reactor or in any other part of the process relative to other prior art. The invention is designed to maximize the process yield of diesel fuel by-products without subjecting the method or the reactor to undesired conditions. Consequently, the reactor does not require a high frequency of cleaning nor does it require the installation of a bleeding pump or a scrapper-like apparatus to continually address the formation of coke inside of the reactor. The device also operates on a continuous basis, thereby causing minimal disruption to overall operations and reducing the need to have either multiple reactors or operating in batches or semi-continuous flow.

There are a number of existing methods/processes for converting waste oils to diesel or diesel-like fuels. For example, U.S. Pat. Nos. 5,271,808 and 5,286,349 issued to Shurtleff disclose a process and equipment design for converting waste oil to diesel. However, although designed with a direct fired heat, the design of the pan shaped reactor and the rest of the systems are dramatically different from the present invention. The process uses a desludging pre-processor to remove the sludge/coke pre-cursor materials from the feedstock. The baffle arrangement within the reactor is intended to direct any heavy materials in the reactor to a draw off point. However, this design element ensures that the sludge/coke forming material spends a lot of time near the hottest part of the reactor resulting in increased coke formation. As a result significant operating and maintenance costs are incurred and loss of production is suffered for the removal and disposal of coke and other heavy by-products.

A number of approaches have been developed to attempt to overcome the coke formation issue and the resultant difficult to control operation. For example, U.S. Pat. No. 5,885,444 issued to Wansbrough et al. discloses a system where the heat for pyrolysis of the waste oil is provided by high volume circulation of the waste oil through an external heat recovery system and reactor system. In addition, a heavy fuel oil containing coke particles and potential coke precursors is continuously removed from the reactor vessel. The heavy fuel oil stream is withdrawn at a rate of approximately 25% of the inlet feed rate and thus significantly reduces the overall process yield to diesel fuel.

As another example, U.S. Pat. No. 6,132,596 issued to Yu discloses a system where the design of the process and reactor is the most different from the present invention. The method employed uses a design where pyrolysis heat is added via rapid circulation of waste oil from a reactor vessel, through the tubes of a fired heater and back into the reactor vessel under high pressure. As the reaction proceeds, coke and coke precursors build up in the reactor and on the walls of the fired heater tubes, requiring the operator to subject the process to a high temperature treatment to convert all residual material to coke. The coke then must be physically cleaned from the inside of the reactor and the fired heater tubes.

Another example, U.S. Pat. No. 5,871,618 issued to Lee et al. discloses a semi-continuous thermal cracking process. The design of the thermal cracking reactor is U-shaped or bathtub shaped. In another model, the bottom is circular. The reactor is located within a combustion chamber comprising multiple burners placed below and along the side of the reactor vessel. The combustion chamber is designed so that the top can be removed and the bottom or the reactor accessed and/or removed for maintenance or cleaning. Heavy materials that do not crack in the initial portion of the process are treated in a batch manner where it is heated to a much higher temperature and turned into a coke containing excess carbon, solid residues and heavy metals. The process requires pausing inflow of feedstock every 50 hours of operation. The reactor heating continues until the remaining waste oil is completely used up inside the reactor, followed by at least 26 hours to coke residual material to ash cake, to allow ash cake to cool down and finally to remove ash cake from the reactor. After cooling, the reactor must be opened and additional time is needed to physically clean the reactor and then bring it back on line and heat it up to operating temperature again.

An improvement on the process and/or device is claimed in U.S. Pat. No. 7,255,785 issued to Kong and Jeong but it is still a semi-continuous process, results in solidifying sludge cake which must then be removed by means of a bleeding valve at the bottom of the vessel and the process results in only 70 percent conversion of feedstock. The process uses Argon gas at the beginning of the process to pre-pressurize the reactor to a pressure substantially above the atmospheric pressure. It is not abundantly clear if the heat is provided by a fired heater.

Finally, WIPO Patent Application No. 2005/087897 to Baker also refers to a process for conversion of waste plastic and waste oil to liquid fuel but again this process is semi-continuous, uses a catalytic converter after the pyrolysis reactor to affect the desired degree of conversion, operates above atmospheric pressure and uses an scrapping device located inside the reactor to address the formation of solid by-products on the walls of the reactor.

SUMMARY OF THE INVENTION

According to the invention there is provided an apparatus for re-refining petroleum-based waste oil to petroleum distillates comprising:

a vertical cylindrical reactor with domed top and bottom heads;

a furnace shell surrounding the vertical cylindrical reactor;

a heating system mounted in the shell for applying heat to the reactor;

a heat deflector mounted to the vertical cylindrical reactor to facilitate dispersion of heat evenly in the furnace and around the vertical cylindrical reactor and control of heat intensity to the bottom of the reactor;

an inlet supply including an inlet connection at one side of the vertical cylindrical reactor for continuously supplying petroleum-based waste oil in liquid form which fills part of the vertical cylindrical reactor;

and a top vapor outlet connection for discharge of vapor from the vertical cylindrical reactor.

Preferably the vertical cylindrical reactor has a liquid hydrocarbon volume in the range of about 1.5 m$^3$ to about 5.0 m$^3$ (about 1,500 L to 5,000 L) with a preferred range from about 2.0 m$^3$ to about 4.0 m$^3$ (about 2,000 L to 4,000 L) and a more preferred range of about 2.0 m$^3$ to about 3.5 m$^3$ (about 2,000 L to 3,500 L).

Preferably the heating system is arranged for maintaining the waste oil in the vertical cylindrical reactor at a temperature ranging from about 325° C. to about 425° C.

Preferably there is provided a vacuum system for reducing the pressure inside the vertical cylindrical reactor to a value in the range comprising of vertical cylindrical reactor at operating pressure below atmospheric pressure with a preferred range of about 0 kPag to about −35 kPag and a more preferred range of about −7 kPag to about −21 kPag.

Preferably the inlet supply is arranged relative to the heating system and the volume of the reactor to provide an average nominal liquid residence time of about 0.5 hours to about 3.0 hours, with a preferred range from about 0.5 hours to about 2 hours and a more preferred range of about 0.75 hours to about 1.75 hours based on the liquid feed volume in the reactor.

Preferably there is provided a system for pre-heating and dehydrating the petroleum-based waste oil prior to the inlet connection.

Preferably there is provided a distillation system for receiving the vapor outlet from the vertical cylindrical reactor and for condensing and distilling a heavy liquid hydrocarbon with a boiling point higher than the diesel boiling point range and a conduit for re-routing the heavy liquid hydrocarbon back into the vertical cylindrical reactor for further pyrolysis.

Preferably the distillation system comprises a distillation tower which is not integrally connected to the reactor.

Preferably the heat deflector comprises a plate located underneath the vertical cylindrical reactor.

Preferably the heating system is located at a bottom wall of the shell and the plate is mounted above on a support attached to the bottom head of the vertical cylindrical reactor.

Preferably the domed top and bottom ends are hemispherical.

Preferably the domed top and bottom ends are elliptical.

Preferably the heating system comprises one or multiple fired burner heaters located at the bottom of the furnace shell.

Preferably the vertical cylindrical reactor has no bottom discharge so that the only discharge is through the vapor outlet.

Preferably the vertical cylindrical reactor has an inside wall which is exposed to the interior with no internal rotating device to either scrape material from the wall or help promote mixing in the vertical cylindrical reactor.

Preferably the vertical cylindrical reactor has a diameter in the range of 1.4 m to 2.3 m with a preferred diameter of 1.8 m.

Preferably the vertical cylindrical reactor has a height in the range of 1.8 m to 3.0 m with a preferred height of 2.3 m.

Preferably the inlet supply is arranged to supply on a continuous operation so as to provide a constant or substantially constant level of liquid in the vertical cylindrical reactor.

Preferably the refractory on the shell is six inch castable refractory.

The arrangement described in the embodiments hereinafter is a vertical cylindrical reactor built precisely for this purpose, conducting pyrolysis of waste oil and converting to diesel fuel range hydrocarbons on miniaturized scale that is commercially viable. The invention allows for the continuous pyrolysis of smaller amounts of feedstock to be converted into valuable petroleum distillates. This pyrolysis reduces the cost of waste oil re-refining. The invention achieves this through an optimum residence time under sub atmospheric pressures during the pyrolysis reaction. The reactor achieves this without the use of any catalyst, internally or externally, and has minimal coke formation inside the reactor relative to other prior art. Consequently, the reactor does not require a high frequency of cleaning nor does it require the installation of a bleeding pump or a scrapper like apparatus to continually address the formation of coke inside of the reactor. The device also operates on a continuous basis, thereby causing minimal disruption to overall operations and reducing the need to have multiple reactors or operate the refining process in batches. This also provides a very high yield of diesel fuel range hydrocarbons from the present invention.

The arrangement described in the embodiments hereinafter provides a novel device operating on a continuous basis where there is a furnace shell, an vertical cylindrical reactor housed inside the furnace shell with a heat deflector placed under the vertical cylindrical reactor and where pyrolysis is caused by heat applied from a burner mounted under the furnace shell under sub-atmospheric pressures with no catalytic additives. The invention includes a vertical cylindrical reactor exposing it to heat from the burner, facilitating a reasonably long residence time for pyrolysis to occur where the resultant vaporised petroleum distillates depart the reactor through a vapour outlet connection located at the top of the vertical cylindrical reactor. Any flue gas generated by the burner can exit the furnace shell through a flue stack located at the top of the furnace shell.

The arrangement described in the embodiments hereinafter relates to an apparatus for producing petroleum distillates from petroleum based waste oil and such apparatus can be viably incorporated in a re-refining facility. It is suited to any size markets but more particularly in smaller markets which cannot support large-scale refining facilities due to a higher capital, operating and transportation costs. The design of the present device is intended to overcome known limitations in prior art such as non-continuous operation, low product yield, significant coke formation and the use of catalysts inside the reactor by providing suitable designs of a vertical cylindrical reactor which includes a furnace shell with refractory lining, one or more burners situated at the bottom or by the sides, a pressure vessel. The pressure vessel, which is an vertical cylindrical reactor, is designed with a maintenance access way, a feed point, exit point and with related equipment and instrumentation control to obtain optimum conditions that provide an uninterrupted flow of high yield petroleum distillates, primarily in the diesel fuel range, with a minimum coke production without the use of catalysts.

Thus, in an aspect, there is provided a method for refining petroleum based waste oil to diesel fuel and products comprising:

(i) dehydrating waste oil to remove free and emulsified water;

(ii) operating a vertical cylindrical reactor to obtain a hydrocarbon vapour from pyrolysis of the dehydrated waste oil;

(iii) operating a hydrocarbon vapour distillation column to condense and distil one or more hydrocarbon fractions including a liquid hydrocarbon within a diesel boiling point range; and (iv) filtering the liquid hydrocarbon in the diesel boiling point range with a regenerable adsorbent material to remove particulates, contaminants, colour bodies, and odour.

In an embodiment, the vertical cylindrical reactor, which may also be a domed vertical reactor, has a capacity of 5,500 liters operated at temperatures ranging from about 325° C. to about 425° C., and at vacuum pressures ranging from about 0 kPag to about −49 kPag.

In another embodiment, there exists a rerouting method to recycle products that are heavier than diesel range hydrocarbons back into the vertical cylindrical reactor for further pyrolysis and the lighter than diesel range hydrocarbons are captured as liquid fuel to be used for process energy, including process heat and electrical generator fuel.

The present invention relates to a system and method for producing diesel fuel and diesel-like products from petroleum based waste oil in a micro-scale processing facility suitable for operation in any size market, but particularly in smaller markets which cannot support large-scale re-refining facilities. The design of the present system and method is intended to overcome at least some of the limitations in the prior art related to non-continuous operation, lower product yield and substantial coke formation by providing suitable designs of the pyrolysis reactor and related equipment, and operation at suitable process conditions that are most advantageous for high yield of a high quality diesel fuel product with a minimum coke production.

Thus, in an aspect, there is provided a method comprising dehydrating raw waste oil, and continuously pumping the dehydrated waste oil into a vertical cylindrical reactor where hydrocarbon pyrolysis occurs and where phase change occurs from liquid to vapour. The vertical cylindrical reactor may be a vertical cylindrical reactor having a suitable capacity for a micro-processing facility. The product of the thermal pyrolysis of dehydrated waste oil in its vapour phase is condensed and distilled in a distillation column to produce a liquid hydrocarbon in the diesel fuel range and to capture those products that are outside the diesel fuel range.

In another embodiment, the products that are heavier than diesel range hydrocarbons are re-routed back into the vertical cylindrical reactor and the lighter than diesel range hydrocarbons are captured as liquid fuel to be used for process energy, including process heat and electrical generator fuel.

In another embodiment, the liquid diesel fuel is pumped through a clarifying regenerative clay filter system to remove unwanted particulates, chemical contaminants and odour & colour to achieve a marketable diesel fuel colour.

In this respect, before explaining at least one embodiment of the invention in detail, it is to be understood that the invention is not limited in its application to the details of construction and to the arrangements of the components set forth in the following description or the examples provided therein, or illustrated in the drawings. The invention is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

The present invention will be better understood and objects of the invention will become apparent when consideration is given to the following detailed description thereof. Such description makes reference to the annexed drawings wherein.

Figure 1:
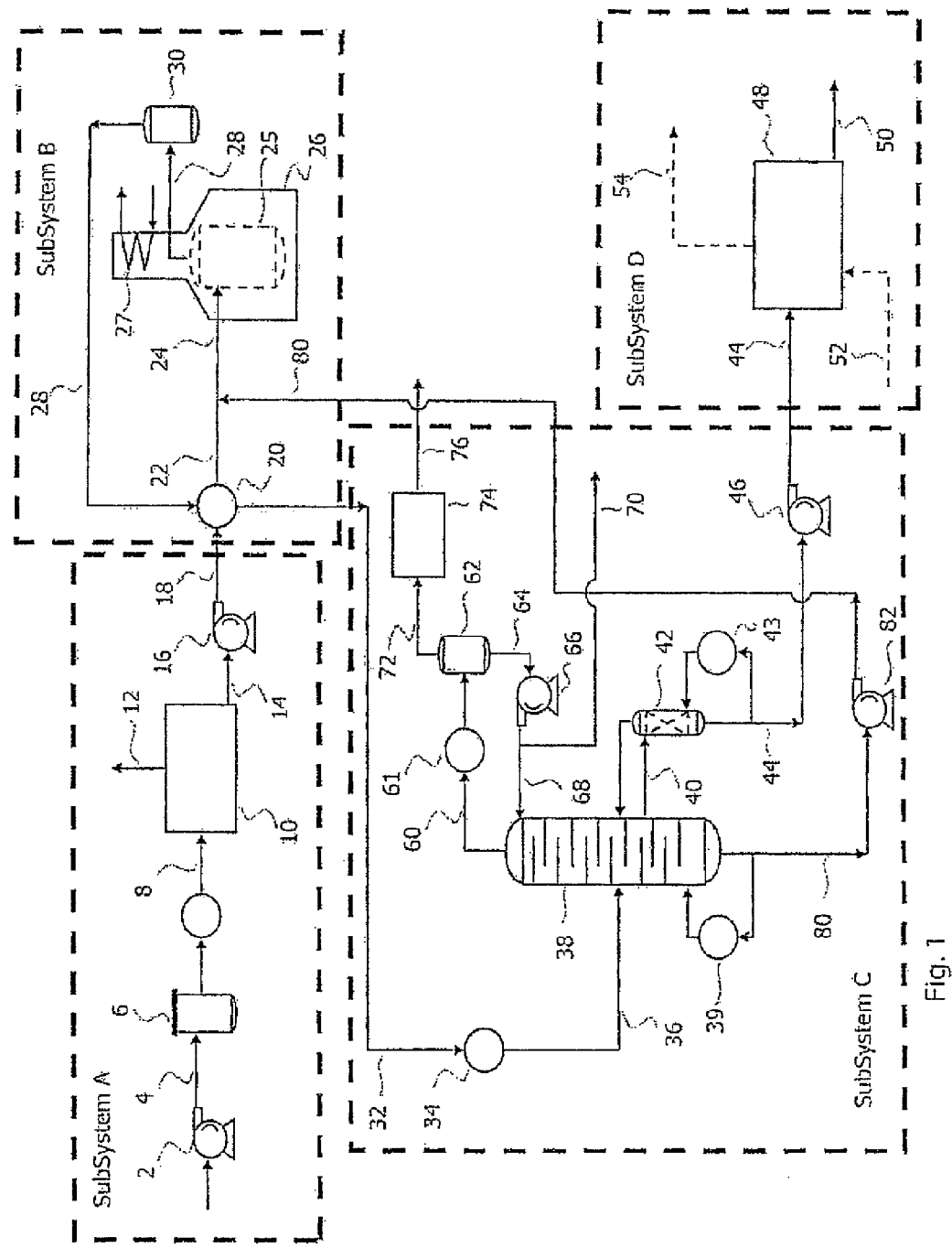
FIG. 1 shows an illustrative system and process flow for processing diesel from waste oil in accordance with a preferred embodiment.

In the drawings, embodiments of the invention are illustrated by way of example. It is to be expressly understood that the description and drawings are only for the purpose of illustration and as an aid to understanding, and are not intended as a definition of the limits of the invention.

DETAILED DESCRIPTION

As noted above, the present invention relates to a system and method for processing diesel from waste oil in a micro-scale processing facility suitable for set-up and operation in virtually any market. In the present disclosure, "micro-scale" refers to a processing facility having a capacity to process anywhere between about 160 L to about 3,500 L of dehydrated waste oil per hour.

Through extensive research and development, the inventors have designed a system and method for producing high quality diesel fuel at a micro-scale, using a system that is transportable and easily set up in virtually any size of market which was heretofore uneconomical for processing waste oils. Illustrative embodiments are now described by way of example.

Waste Oil Receiving

In an illustrative embodiment, a waste oil receiving facility is located at the waste oil processing plant to provide feedstock to the system. Waste oil may be sourced from a defined local region, preferably within a defined maximum distance from the processing site or within a given geographic region in order to reasonably control transportation costs. In accordance with environmental regulations, all necessary precautions should be taken to prevent any spillage during offload of waste oil into feedstock tanks located at the waste oil receiving facility. Suitable spill kit units should be available on site in order to initiate proper clean up procedures in the event of a spill.

Waste oil feedstock suppliers should preferably be pre-screened and required to provide waste oil samples prior to delivery for quality control testing for contaminants (e.g. PCBs). Feedstock suppliers should also be required to continually provide samples of their waste oils in order to test the samples against minimum standards for the feedstock. A plant supervisor or designated inspector should be satisfied that the quality of the waste oil feedstock meets or exceeds minimum standards before the waste oil may be pumped into the waste oil feedstock tank. As an illustrative example, in an embodiment, the standards may identify maximum water content of anywhere between about 10% to about 50%. In another embodiment, the minimum standards may also specify that the waste oil cannot have PCB contamination.

As an illustrative example only, the waste oil capacity of feedstock tanks may be in the range of approximately 10 $m^3$ to 90 $m^3$ (10,000 L to 90,000 L), with multiple storage tanks potentially holding hundreds of thousands of liters of feedstock for processing. It is expected that the preferred embodiment can produce approximately 1 $m^3$ (1,000 L) of finished diesel product per hour, and more if scaled appropriately.

Overview of System and Method

FIG. 1 shows an illustrative overview of a system and method for processing diesel from waste oil in accordance with a preferred embodiment. As shown in this illustrative overview, the system generally comprises four subsystems, including: (i) a dehydration subsystem (Subsystem A); (ii) a vertical cylindrical reactor subsystem (Subsystem B); (iii) a distillation subsystem (Subsystem C); and (iv) a filtration subsystem (Subsystem D).

As shown, Subsystem A is an illustrative dehydration subsystem in which waste oil feed transfer pump 2 continuously brings waste oil feedstock in process stream 4, that may contain a range from about 0% to about 50% free water and/or emulsified water, through a feed filter 6 to remove any large particulates which may impede later stages of the process. As an illustrative example, feed filter 6 may have a filter size of about 20 microns to about 100 microns.

In an embodiment, stream 8 is preheated before passing into the dehydrator unit 10. Preheating with waste heat from the process is desired to increase overall thermal efficiency, but is an optional step and not necessarily an integral part of the process. Dehydrator unit 10 removes free and emulsified water and light waste material from the feedstock waste oil by heating the material to temperatures ranging from 100° C. to 110° C. at nominally atmospheric pressure. It will be appreciated, however, that in addition to thermal dehydration, there are various alternative methods for dehydrating a waste oil stream including coalescence, gravity separation vacuum dehydration, centrifugal separation dehydration, adsorption dehydration, and absorption dehydration. In an embodiment, where free and emulsified water percentages are above 20%, there is significant advantage to be gained by employing mechanical de-water techniques that may include but are not limited to coalescers and/or gravity separation and/or centrifuge separation to reduce water content below 10% before other more energy intensive processes such as thermal separation are employed.

Free and emulsified water is removed from the waste oil through the dehydration process to prevent unwanted side reactions and formation of corrosive compounds later in the process, where the feedstock waste oil will be heated to higher temperatures. Water vapours and light waste material resulting from the dehydration process may be incinerated or otherwise safely disposed of after being removed via stream 12. Depending on the operating pressure of the dehydration process and the disposal location, a fan or blower may be required to transport the waste material through piping or ducting from the dehydrator to the disposal location.

In one embodiment the disposal method may include incineration in a flare, or incineration in a closed-type thermal incinerator, or incineration in a firebox of a fired heater such as fired heater shell 26, or vent to atmosphere. The advantage of disposal of the material in the vapour phase is that there will be no liquid waste vapour streams produced by the process. In another embodiment, the materials in stream 12 can also be condensed to form a liquid waste stream that can be disposed of in a number of environmentally responsible ways.

Still referring to FIG. 1, the dehydrated waste oil stream 14 is pumped out of dehydrator 10 by reactor feed pump 16 via stream 18 and into pre-heater 20 in Subsystem B. In an embodiment, pre-heater 20 serves to increase the temperature of stream 22 to a range of about 125° C. to about 350° C.—with a preferred range from about 250° C. to about 350° C. and a more preferred range of about 300° C. to about 350° C.—to prepare the waste oil for thermal cracking (thermal pyrolysis) in vertical cylindrical reactor 25 of Subsystem B. In an embodiment, the heat added in pre-heater 20 is provided by cooling vertical cylindrical reactor effluent vapour stream 28 in a shell and tube heat exchanger. The use of heat from hot process stream 28 serves to increase the overall thermal efficiency and hence economic viability of the process.

In another embodiment, due to the relatively small scale of the process, pre-heater 20 could be designed as a double-pipe heat exchanger, a multi-tube double-pipe heat exchanger or a plate-and-frame heat exchanger. In still another embodiment, heat for pre-heater 20 could be provided by an appropriate heat medium or pre-heater 20 could be operated without any source of heat resulting in the entire heat load being placed on the reactor 25 and/or furnace shell 26.

In an embodiment, the thermal reactor is a fired reactor consisting of the vertical cylindrical reactor 25 and the fired furnace shell 26. The vertical cylindrical reactor is designed to induce thermal pyrolysis in the dehydrated waste oil. As shown, the pre-heated, dehydrated waste oil feed stream 22 merges with the heavy hydrocarbon recycle stream 80 to form total reactor feed stream 24 which continuously feeds into vertical cylindrical reactor 25. Furnace shell 26 provides the heat required to induce thermal pyrolysis of stream 24.

In an embodiment, vertical cylindrical reactor 25 is a cylindrical vessel with standard dished heads that may operate with a volume of liquid hydrocarbon (i.e. dehydrated waste oil from Subsystem A) ranging from about 1.5 m³ to about 5.0 m³ (about 1500 L to 5000 L), with a preferred range from about 2.0 m³ to about 4.0 m³ (about 2000 L to 4000 L) and a more preferred range of about 2.0 m³ to about 3.5 m³ (about 2000 L to 3500 L).

In an embodiment, furnace shell 26 is a fired heater with one bottom mounted burner fuelled by a naphtha range light liquid process fuel and controlled either manually or, in conjunction with the fuel supply system, by a burner management system. In another embodiment, furnace shell 26 can be of a cabin or box type fired heater. In another embodiment, furnace shell 26 can have a plurality of floor and/or wall mounted burners. In another embodiment the multiple burners are fuelled by natural gas and/or propane, and/or fuel oil and/or other diesel-like fuel.

In an embodiment, vertical cylindrical reactor 25 operates in sub-atmosphere conditions, controlled by vacuum pump system 74, of about 0 kPag to about −49 kPag (about 0 psig to −7 psig), with a preferred range from about 0 kPag to about −35 kPag (about 0 psig to −5 psig) and a more preferred range of about −7 kPag to about −21 kPag (about −1 psig to −3 psig), heated to a range of about 325° C. to about 425° C., with a preferred range from about 375° C. to about 415° C. and a more preferred range of about 400° C. to about 410° C.

Under the reaction conditions described, the total reactor feed stream 24 has an average nominal liquid residence time in the vertical cylindrical reactor 25 of 0.5 hours to about 3.0 hours, with a preferred range from about 0.5 hours to about 2.0 hours and a more preferred range of about 0.75 hours to about 1.75 hours based on the inlet liquid feed volume. While in vertical cylindrical reactor the fresh waste oil feed and recycled heavy hydrocarbons undergo mild cracking reactions that reduce the size of the hydrocarbon molecules so that most of the resulting molecules have a boiling point in the diesel fuel range or lighter. Once the feed molecules have been cracked into the lighter molecules, the lighter molecules vaporize quickly and leave the reactor. The continuous addition of feed ensures that a constant level is maintained within the vertical cylindrical reactor. The mild operating conditions of temperature and pressure help ensure high selectivity to desired products.

In addition to the high selectivity, the mild conditions and relatively low heat flux rate from fired furnace shell 26 into the vertical cylindrical reactor 25 ensure that the bulk process temperature as well as the reactor wall temperature remain low enough to minimize coke formation without having to withdraw any sludge and/or heavy liquid and/or liquid/solid streams from the reactor to facilitate long term (1-12 months depending on feedstock quality and operating conditions) continuous operation. The small amounts of coke that do form on the inside of the vertical cylindrical reactor walls can easily be removed by mechanical means such as physical scraping and/or sand blasting and/or water blasting after the reactor is drained, cooled and purged. All internal surfaces of vertical cylindrical reactor 25 and furnace shell 26 are easily accessible for cleaning.

In an embodiment, waste heat in the flue gases from furnace shell 26 can be recovered to one or more fluids passing through convection section heat recovery coil(s) 27. These potential heat recovery fluids include air being pre-heated for use in the furnace shell 26 as combustion air, and/or a circulating heat medium fluid used to heat other parts of this process and/or providing heat to users outside this process, and/or water for the production of steam for use within the process or by users outside this process, and/or a process stream requiring heating. The primary purpose of heat recovery coil(s) 27 is to increase the overall thermal efficiency of the process.

In an embodiment, after undergoing thermal pyrolysis, cracked hydrocarbons leave vertical cylindrical reactor 25 as a vapour via reactor effluent stream 28 and pass through liquid knock out vessel 30 to remove any liquid inadvertently contained in the vertical cylindrical reactor effluent. Although inclusion of liquid in the reactor effluent vapour is a rare occurrence, knock out vessel 30 protects downstream equipment and heat transfer surfaces from being fouled by potentially tar-like substance that may be present in any carryover liquid. Stream 28, the final resulting vapour phase, is used to transfer thermal energy to pre-heater 20, as discussed previously, and serves to increase the thermal efficiency of the process while simultaneously decreasing the utility cooling requirements for the process. The cooled reactor effluent stream 32 exits pre-heater 20. The extent of cooling of stream 32 is controlled by the extent of heat transfer to stream 22. In an embodiment, stream 32 can remain completely in the vapour phase. In another embodiment, stream 32 can be partially condensed.

The partially cooled stream 32 and flows to the fractionation column feed cooler 34 where it is further cooled to a temperature in the range of about 200° C. to about 300° C. and partially condensed. It will be appreciated that selection of an operating temperature for stream 36 at the outlet of cooler 34 is dependent on the desired heat balance and operating conditions to be employed in fractionation column 38. Selection of conditions for column 38 will depend on available heating and cooling sources and fractionation system equipment costs to arrive at an optimal solution. Upon leaving cooler 34, the partially condensed reactor effluent stream 36 feeds into fractionation column 38.

In Subsystem C, which comprises a fractionation column and associated auxiliary equipment, reactor effluent stream 36 is distilled in fractionation column 38 into a plurality of distinct hydrocarbon fractions. In this illustrative example, four different hydrocarbon fractions are produced, but it will be appreciated that this number may be increased or decreased, as may be desired. For example, if the final product specification is for a diesel like fuel that does not have a 90% distillation recovery requirement typical of ASTM specification D975, then a distinct hydrocarbon product that is heavier than the diesel cut is not necessary. Similarly, if there is no need for a distinct light liquid hydrocarbon to be used as a fuel or a separate product, only one product need be drawn from the overhead section of fractionation column 38 rather than the two products outlined in this illustrative example. If another intermediate hydrocarbon fraction such as a kerosene or jet fuel-like product is required, another product can be drawn from an intermediate location on fractionation column 38.

In an embodiment fractionation column 38 will have an internal diameter in the range of 18 inches to 36 inches and contain 20-30 ideal equilibrium stages of separation. In an embodiment where the fractionation column diameter is 24 inches or larger, cartridge or fixed distillation trays can be the mass transfer devices inside column 38 providing the separation stages. In another embodiment random or structured packing will be used as the mass transfer media inside column 38.

Within fractionation column 38 light hydrocarbon compounds that do not meet the required diesel fractionation range travel upwards and exit column 38 via column overhead stream 60. Overhead stream 60 is cooled and partially condensed in the fractionator overhead condenser 61. The resulting two-phase mixture is separated in overhead receiver drum 62. A portion of resultant overhead liquid stream 64 is diverted back to fractionation column 38 as reflux by overhead pump 66. The balance of the overhead liquid stream is collected as a process fuel stream 70. The reflux stream 68 returned to column 38 is used to regulate the amount of the hydrocarbon components in the lighter boiling point range of the diesel cut which are collected into the diesel side draw stream 40. The overhead receiver vapour stream 72 is drawn from receiver drum 62 by vacuum pump 74. The resulting stream 76 is a light hydrocarbon mixture and can be used for fuel of other purposes or can be disposed of in an appropriate manner, including, but not limited to incineration in a flare, incineration in a closed-type thermal incinerator, or incineration in the firebox of a fired heater. Vacuum pump 74 regulates the extent of the process vacuum that is drawn on fractionation column 38 and its associated equipment, on the reactor effluent system and on the vertical cylindrical reactor 25 itself. In an embodiment, the vacuum pump 74 will be an oil liquid ring pump to avoid a contaminated waste water stream. In another embodiment the vacuum pump 74 is a water liquid ring pump or alternately vacuum service can be provided by a steam ejector. In this latter embodiment, a contaminated waste water stream will be produced.

Heavy hydrocarbons that do not meet the required diesel boiling point range travel downward in fractionation column 38 and are diverted by fractionation bottoms pump 82 via stream 80 back to reactor feed stream 24 for reprocessing in vertical cylindrical reactor 25. This recycling of hydrocarbon material allows for the preservation of hydrocarbon and increases operational yields. Relative to prior art, the primary advantage of this heavy hydrocarbon recycle stream coming from the fractionation column is that only those hydrocarbon compounds that require additional thermal pyrolysis are subjected to further treatment in the reactor. In prior art there is either no recycle of heavy hydrocarbon or the entire reactor liquid effluent is recycled to the reactor, including compounds already suitable for diesel that are potentially further cracked so that they are lighter than required for diesel. In either prior art approach there is a loss in diesel product yield that the present invention overcomes.

Heat is added to the bottom of column 38 via a reboiler 39 to create upward flow of vapour in the column to ensure that diesel range components are not drawn out with the heavier hydrocarbons in stream 80. In an embodiment, a vertical thermosyphon reboiler is employed. However, it will be appreciated that alternate reboiler types including but not limited to the reboiler and/or a stab-in bundle built into column 38 could also provide the heat input for column 38.

In an embodiment, a liquid hydrocarbon side draw stream 40, containing compounds that meet diesel fuel higher boiling range specifications but that may contain some compounds that are lighter than the lower boiling point range specifications, is removed from an intermediate draw point on column 38. Stream 40 flows to the top of side stripper 42 for final separation that removes the compounds that are lighter than lower end of the diesel distillation point range. This separation ensures that the diesel fuel meets specifications such as the ASTM D975 flash point specification. In an embodiment, the side stripper reboiler 43 is a vertical thermosyphon reboiler. However, it will be appreciated that alternate reboiler type such as a stab-in bundle built into side stripper 42 could also provide the heat input for side stripper 42. The light, stripped hydrocarbons are returned, in the vapour phase, to column 38 and the side stripper bottoms stream 44 constitutes raw diesel fuel.

In an embodiment, thermal energy required for dehydrator 10, reboiler 39, and the reboiler for side stripper 42 can be provided by a number of different heating methods including steam, heat medium or fired heaters. In addition, cooling of fractionation column overhead stream 60, fractionation column feed cooler 34, and raw diesel stream 44 can be provided by air cooling and/or cooling water and/or by other appropriate cooling means.

In a preferred embodiment, the entire process is designed without a system to produce steam for use in the process. This type of design is less complicated to build and operate and precludes the generation of a waste water stream from the condensed process steam. All of these factors make the present invention more suitable for set-up and operation in virtually any market in any part of the world. However, it will also be appreciated that for installation in locations where a supply of process steam is available, the fractionation system described in Subsystem C can be operated effectively using stripping steam directly injected in to column 38 in place of reboiler 39 and directly injected into side stripper 42 in place of the side stripper reboiler 43. This change will also impact the design of the overhead system of the fractionation system.

Still referring to FIG. 1, in Subsystem D, filtration feed pump 46 draws raw diesel stream 44 to filtration unit 48 for the removal of particulates, contaminants, colour bodies, and odour contained in the diesel by contacting the raw diesel with an adsorbent clay material. In this embodiment, a regenerative filtration unit is used to filter the raw diesel fuel into a marketable grade of diesel fuel. Within the filtration unit, the raw diesel feed temperature is controlled in the range of about 35° C. to 100° C. The filtration portion of the filtration system consists of two or more banks of filter vessels. Each bank may consist of one or a plurality of individual filter vessels arranged in parallel operation such that the diesel fuel flows through all vessels in a particular bank simultaneously. Each bank has flow controlled by automated shutoff valves for ease of operation while limiting the number of required valves. In will be appreciated, however, that the filtration unit could also be operated with manual valves instead of automatic valves and that valves, manual or automatic, could also be installed on the inlet and outlet of each filter vessel.

In an embodiment, there is a filter bed of granulated clay contained within each filter vessel. Granulated clay is required to ensure even and well distributed flow of diesel fuel to each filter vessel without incurring excessive pressure drop. As an example, the granulated clay is fuller's earth (calcium bentonite). In another example, the clay is activated bauxite. Other typical activated bleaching clays are only available in pulverized form and hence not practical for use in the regenerable filtration system.

After the adsorptive capacity of the clay beds in a particular bank are exhausted, the flow of diesel fuel is diverted to another filter vessel bank for processing, such that the overall filtering process is continuous. The exhausted bank of filter vessels is prepared for regeneration by draining the remaining liquid diesel fuel from the vessels for re-processing. Regeneration entails introducing heated ambient air stream 52 into the filter vessels on a continuous basis until the combustible residual diesel and adsorbed contaminants on the clay particles begins to oxidize. At this point the self-sustaining "burn" phase of the regeneration begins and the burn front slowly moves through the clay bed oxidizing the residual diesel and adsorbed contaminants. The vapour phase products of this combustion process are vented and/or oxidized from the clay media/filter vessel via exhaust stream 54. Stream 54 can be sent for incineration to ensure complete destruction of all hydrocarbons and other contaminants in this stream. It is desirable to carefully control the rate of ambient air stream 52 to ensure that the regeneration burn does not overheat the clay media and damage its adsorptive capacity. After the burn front reaches the end of the filter vessel the oxidation stops. Non-heated air continues to flow until the clay media and filter vessels are sufficiently cooled that they can be brought back into diesel fuel filtration service. The regenerated bank will remain in a "ready" mode until needed back in service when another of the banks is ready for regeneration. Finished diesel product from filtration unit 48 leaves via stream 50 for collection.

Implementation Example

Figure 2:
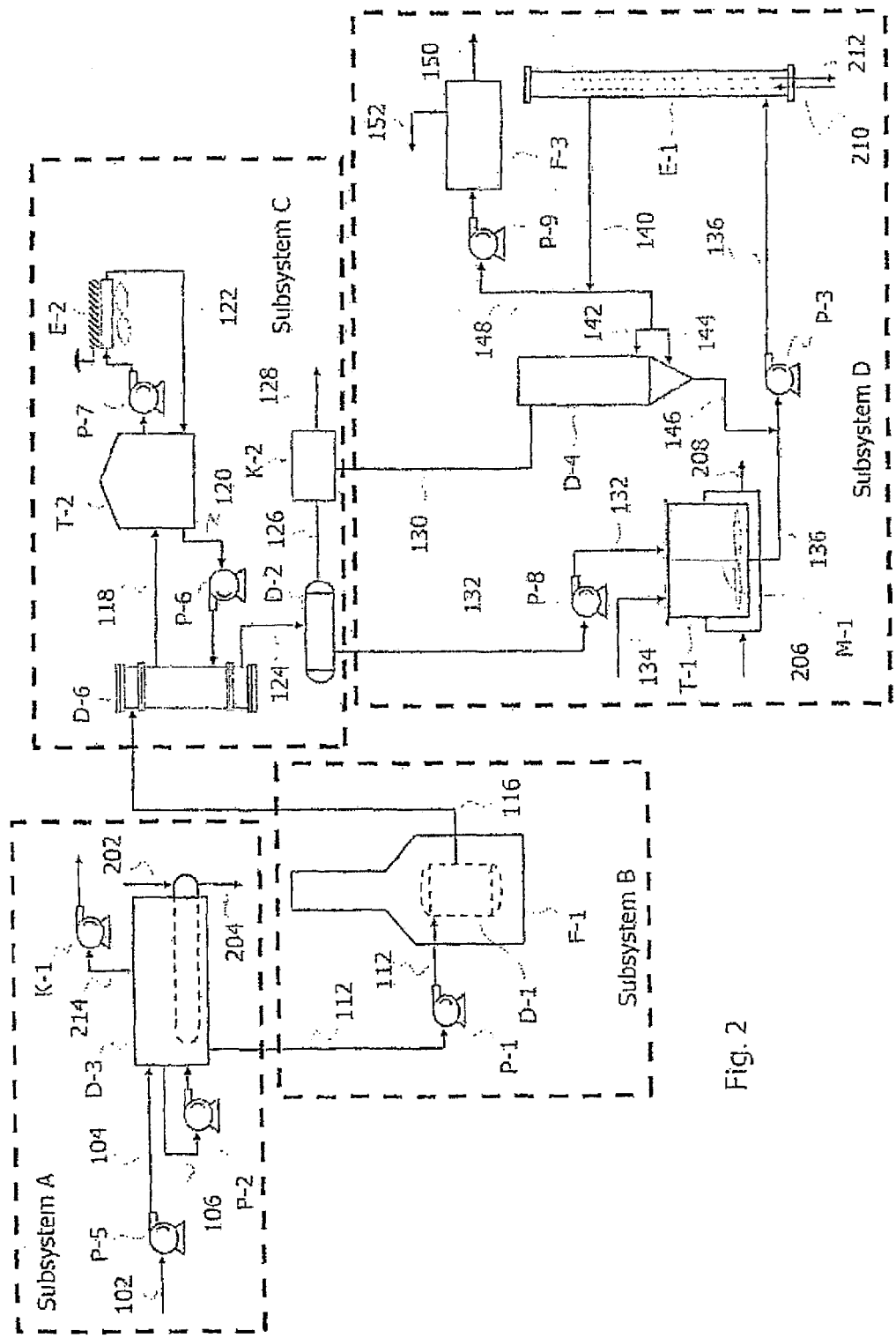
FIG. 2 shows an illustrative system and process flow for processing diesel from waste oil in accordance with another embodiment.
Figure 3:
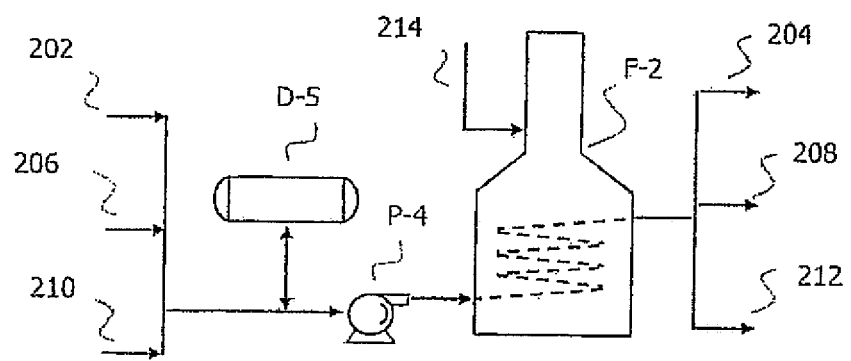
FIG. 3 shows an illustrative system and process flow for use of a heating medium in an embodiment.

FIG. 2 and FIG. 3 show a schematic block diagram of an illustrative implementation of the disclosed invention by way of example. This example is an implementation that lends itself best to a prototype or research and development application. This embodiment can be operated in a continuous, semi-batch or batch mode depending on the needs of the user. In a manner analogous to the preferred embodiment previously described, this embodiment also generally comprises four subsystems, including: (i) a dehydration subsystem (Subsystem A); (ii) a thermal reactor subsystem (Subsystem B); (iii) a condensation subsystem (Subsystem C); and (iv) a filtration subsystem (Subsystem D).

As shown in FIG. 2, Subsystem A is an illustrative dehydration subsystem in which waste oil feed transfer pump (P-5) first continuously brings waste oil from storage (stream 102) that generally contains 5-10% free water and/or emulsified water and transfers it via waste oil dehydrator feed stream 104 to dehydrator (D-3). The waste oil feedstock is heated in dehydrator (D-3) just above boiling point of the water in the stream at approximately atmospheric pressure to separate and remove water content. The preferred embodiment outlined a number of types of dehydration methods that are suitable for the service. In this example a thermal dehydration method is utilized. When operating in a batch or semi-batch mode, dehydrator (D-3) maintains operational temperatures at slightly above boiling point of $H_2O$, at approximately 105° C. (or 221° F.) for a residence time (i.e. the amount of time a particle spends in a particular system) to reach the operational temperature. Once the fluid has reached operating temperature it is ready to be drawn down and pumped to the reactor. The operating temperature is maintained by a circulating heat medium ("Dowtherm") supply stream 202 that flows through the tubes of the heating coil stubbed into the main dehydrator vessel body. Dowtherm return stream 204 leaves the heating coil to return to the Dowtherm system to be reheated. FIG. 3 depicts an embodiment of the Dowtherm system that is further described later in this document.

When filling and operating dehydrator (D-3), it is desirable to ensure that the separator level gauge reads a minimum level of 30% level to a maximum of 70% level before operating the Dowtherm loop. The dehydrator circulation pump (P-2) draws a portion of the dehydrator contents via stream 106 and returns the material to the dehydrator. The circulation causes the dehydrator contents to be well mixed, promoting good heat and mass transfer to remove the water from the waste oil. P-2 should be operational at all times when the dehydrator heating coil is operating. A dehydrator blower (K-1) is shown at the top of dehydrator (D-3) that draws the evaporated water and any other light material that volatilizes at dehydrator operating conditions and transfers the vapour stream to the Dowtherm heater (F-2) firebox for incineration.

As shown in FIG. 2, Subsystem B is an illustrative thermal reactor subsystem. When the waste oil has been sufficiently dehydrated, it is fed via dehydrated waste oil stream 112 by reactor feed pump (P-1) to vertical cylindrical reactor (D-1). Fired furnace shell (F-1) provides heat to vertical cylindrical reactor (D-1) to induce thermal pyrolysis of the waste oil. In this embodiment furnace shell (F-1) is of a vertical cylindrical design with a single bottom mounted burner supplied fuelled by liquid diesel fuel. In this illustrative example, the vertical cylindrical reactor (D-1) is heated to a range of approximately 400° C.-410° C., and more preferably 405° C.-410° C., while under a vacuum pressure ranging from −21 to −35 kPag (−3 to −5 psig). These operating conditions cause the cracking of hydrocarbon compounds into smaller hydrocarbon compounds that quickly vaporize. If the vertical cylindrical reactor (D-1) operates at a higher temperature, then the resulting rapid coking becomes problematic. In addition, during operation of the shell (F-1), it is important to ensure that temperature of the vertical cylindrical reactor inside wall does not exceed 650° C. in order to minimize coking. Should the reactor wall temperature reach this level, it is highly recommended that an emergency shut-down procedure is employed.

In normal operation the thermal reactor should maintain a level that is at least half full, based on sight glass or other level measurement method to ensure acceptable performance. As such there is a need for a constant flow of dehydrated waste oil into vertical cylindrical reactor (D-1) from reactor feed pump (P-1) and hence the vertical cylindrical reactor can only effectively be operated in a continuous manner (constant inflow and outflow of material). During start up of the vertical cylindrical reactor subsystem, it is recommended that vacuum pump (K-2) be activated to depressurize the entire Subsystem B and C to −3 to −5 psig before the furnace shell (F-1) burner is lit.

As shown in FIG. 2, Subsystem C is an illustrative condensation subsystem. In this example, condenser (D-6) is operatively interconnected with vertical cylindrical reactor (D-1). The resulting hydrocarbon vapour stream from vertical cylindrical reactor (D-1) is carried via reactor effluent stream 116 to vertically mounted shell-and-tube condenser (D-6). Condenser (D-6) facilitates the partial condensation of the vapour hydrocarbon compounds into a two phase mixture by cooling against a circulating a cooling medium. The reactor effluent vapour stream 116 enters the tube side of condenser D-6 and the resulting liquid raw diesel flows by gravity to condenser surge tank (D-2). The non-condensed vapours in the condenser effluent stream 124 are drawn by vacuum through condenser surge tank (D-2) and transported via surge tank vapour stream 126 to vacuum pump K-2. The vacuum pump (K-2) provides negative pressure for the operatively interconnected vertical cylindrical reactor (D-1), condenser (D-6) and condenser surge tank (D-2). This single stage of separation of liquid and vapour phases from the partially condensed reactor effluent is an alternative to the more complex distillation subsystem described in the preferred embodiment. The condensing system is easier and less expensive to implement, but provides less overall control of the final diesel product quality and yield.

Condenser surge tank (D-2) acts as a buffer against fluctuations in hydrocarbon operating levels and allows any undesired solid material in the condensed reactor effluent stream, such as asphaltenes to settle to the bottom of the surge tank (D-2) for later collection. Condenser (D-6) is operated to maintain a temperature in surge tank (D-2) of no more than 165° C. Should surge tank (D-2) temperature by greater than 165° C., it is indicative of incomplete cracking of hydrocarbons in vertical cylindrical reactor (D-1). A line and pump (not shown) allows for liquids in the surge drum to be recycled to vertical cylindrical reactor (D-1) for further processing in the event of a high temperature event in surge tank (D-2).

Glycol is provided as a cooling medium from coolant tank (T-2) and is continuously circulated through the shell side of condenser (D-6) by glycol circulation pump (P-6) via glycol supply stream 120 and glycol return stream 118. In this example, the thermal energy transferred from the reactor effluent to the glycol is ultimately transferred to ambient air by glycol air cooler (E-2). The heated glycol is pumped by glycol air cooler circulation pump (P-7) to glycol air cooler (E-2). Once cooled in E-2 by ambient air passing over the glycol-containing tubes of E-2, the glycol is returned to coolant tank (T-2). It can be appreciated that the necessary operating temperature of the glycol will vary based on operating parameters such as the reactor (D-1) inlet flow rate, the desired cracking temperature in D-1 and the desired condensing temperature measured in surge drum (D-2).

As shown in FIG. 2, Subsystem D is an illustrative filtration subsystem for the removal of particulates, contaminants, colour bodies, and odour contained in the diesel. Raw condensed diesel stream 132 is pumped by mix tank feed pump (P-8) into mix tank (T-1) where, in this illustrative example, fresh clay (calcium bentonite) is added on a batch basis by input 134. Mix tank (T-1) serves to blend the raw diesel and clay bentonite, generally at a ratio of 4,000 liters of raw diesel to 1,000 liters of clay bentonite, using mixer (M-1) located inside mix tank (T-1) for approximately 10 minutes. For the purposing of testing and research, the clay bentonite can be added manually to allow for various input levels. The resulting diesel and clay blend exits mix tank (T-1) by mixed diesel/clay stream 136 and is pumped further in the process by contactor circulation pump (P-3). For the purposes of testing and research, mix tank (T-1) is often run in batch mode so that it is filled, mixed and then completely emptied by contactor circulation pump (P-3) into the contactor loop.

The diesel/clay blend in mix tank (T-1) is kept warm (or reheated if there has been a substantial delay in transfer of material from surge tank (D-2) to mix tank (T-1) resulting in a cool raw diesel stream 132) by circulating heat transfer medium ("Dowtherm"). Heated Dowtherm is pumped from supply stream 206 to a jacket surrounding mix tank (T-1) to transfer the thermal energy of the Dowtherm to the diesel/clay blend. Cooled Dowtherm is returned to Dowtherm heater (F-2) by return stream 208. FIG. 3 depicts an embodiment of the Dowtherm system that is further described later in this document.

The mixed diesel/clay stream from mix tank (T-1) is pumped by contactor pump (P-3) to heat exchanger (E-1), where temperature of the mixed diesel/clay stream is increased to a range of 185° C. and 205° C. in preparation for filtration. Dowtherm is used to heat the mixed diesel/clay stream. Dowtherm from supply stream 210 is pumped into heating coils in heat exchanger (E-1). The small diameter and length of the contact coils within the heat exchanger allow for a high degree of thermal energy transfer between the Dowtherm and the mixed diesel/clay that is pumped past the heating coils. Cooled Dowtherm is circulated back to Dowtherm heater (F-2) for reheating. The heated mixed diesel/clay stream exits the heat exchanger by stream 140.

Heat exchanger exit stream 140 is split into two streams; one to be sent for filtration and one to be re-circulated. Splitting stream 140 allows for control of mixed diesel/clay volumes entering filtration unit (F-3), to be further described later in this illustrative example. Stream 140 diverted for re-circulation is split into streams 142 and 144 for entry into contact tower (D-4). Stream 142 constitutes approximately 70% of the volume of diverted stream 140 and enters the cylindrical section of contact tower (D-4). Stream 144 enters the inverted cone section of contact tower (D-4) at a downward angle to prevent blockages of the bottom exit stream on the contact tower. Contact tower (D-4) serves to help regulate the volume of mixed diesel/clay entering filtration unit (F-3) and maintain acceptable operating pressures in the filtration unit. Vacuum pressure is applied to the contact tower by vacuum pump (K-2) and a hydrocarbon vapour stream 130 is withdrawn through vacuum pump (K-2). The combination of vapour draw stream 126 from surge tank (D-2) and vapour stream 130 comingle in K-2 to produce a total vapour vent stream 128 that is routed for appropriate disposal or re-use as fuel. The removal of hydrocarbon vapour stream under vacuum from contact tower (D-4) at approximately 185° to 205° C. serves as a second vapour-liquid separation step on the raw diesel to remove more of the lighter hydrocarbon materials that may present issues with regard to specifications such as ASTM D975 flash point. Mixed diesel/clay exits contact tower (D-4) by contactor tower bottom stream 146, where it is re-circulated by contactor circulation pump (P-3) via stream 136.

Mixed diesel/clay stream 140 that is not diverted to the contact tower is pumped by filtration feed pump (P-9) to filtration unit (F-3). In this illustrative example, the filtration unit is a hydraulically operated filter press that separates the diesel and bentonite clay into a clay containing filter cake built up on filter paper within the filter press and a clean, filtered diesel. During separation the clay carries unwanted particulates, contaminants, colour bodies, and odour from the diesel and is removed from the filtration unit as waste clay stream 152 on an intermittent basis when the pressure drop across the filter exceeds 103 kPa (15 psi). It will be appreciated that the period that the filter press can remain on-line between cleanings is dependent on the volume of diesel filtered, the ratio of clay to diesel in the mixture and the specific design of the filter press. In the illustrative example, typical operating time between filter cleanings is 24-36 hours. Filtered diesel fuel leaves the filtration unit by stream 150, where it can be collected for final testing, storage and distribution.

Shown in FIG. 3, is a heating medium circulation system for the transfer of heat energy. Dowtherm heater (F-2) provides heat to a heat transfer medium ("Dowtherm") by operating at a temperature range of 300° C.-350° C. Heated Dowtherm is pumped by Dowtherm circulation pump (P-4), at a pressure of 15 psi, to units D-3, T-1, and E-1 via streams 202, 206, and 210, respectively. After the transfer of heat energy in the various vessels, Dowtherm is re-circulated back to Dowtherm heater (F-2) along return streams 204, 208, and 212. Dowtherm surge tank (D-5) acts as a buffer against fluctuations in Dowtherm operating levels caused by thermal expansion.

Figure 4:
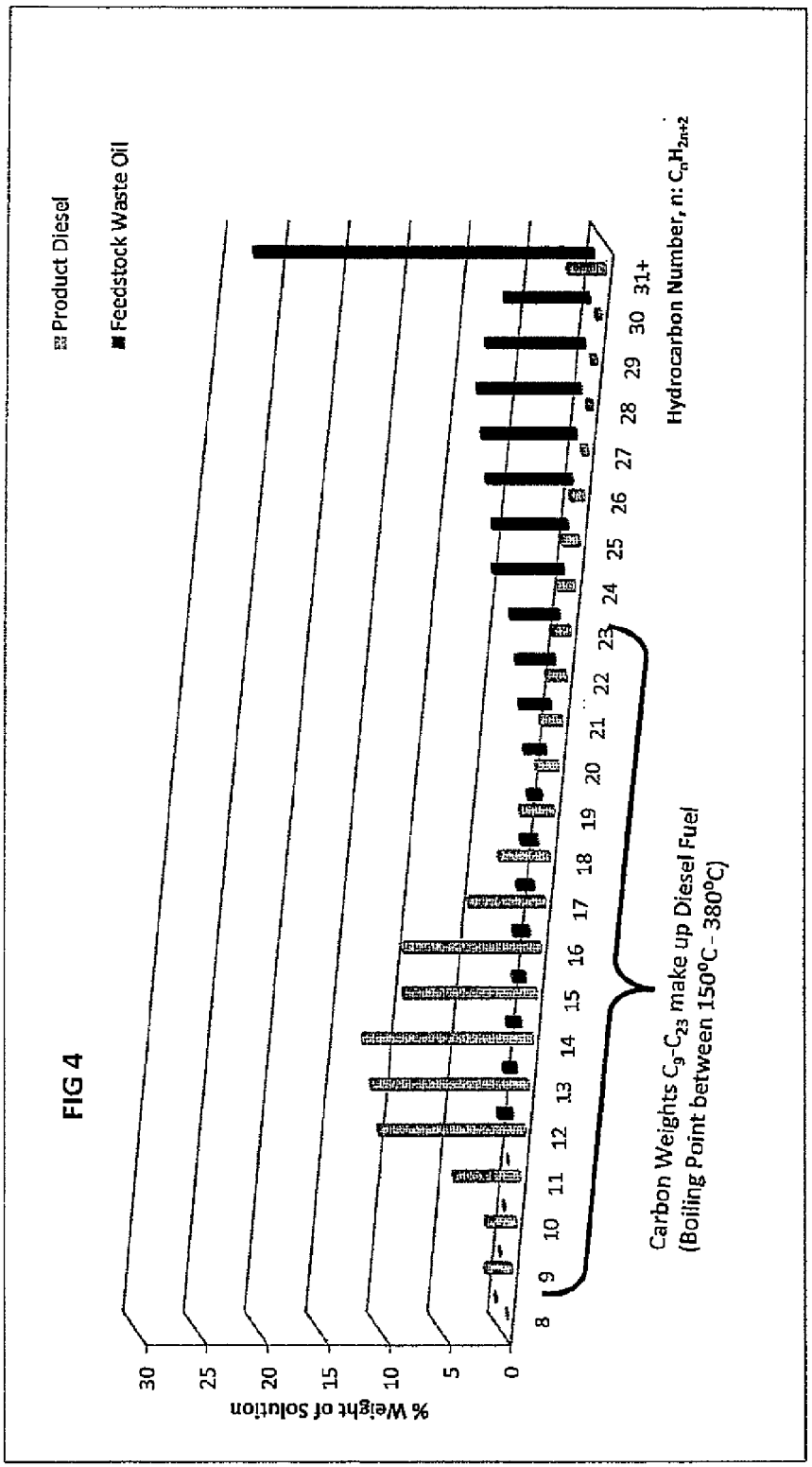
FIG. 4 shows a graph of hydrocarbon chain breakdown by weight.

FIG. 4 demonstrates that the product diesel fuel range will be in vapour form below the operating temperature. The vapour exiting the reactor will generally consist of molecules within the diesel fuel range because the intact heavier hydrocarbons will remain in liquid phase.

Thus, in an aspect, there is provided a method for re-refining petroleum-based waste oil to diesel fuel and petroleum products, comprising: (i) dehydrating waste oil to remove free and emulsified water; (ii) operating a vertical cylindrical reactor to obtain a hydrocarbon vapour from pyrolysis of the dehydrated waste oil; (iii) operating a hydrocarbon vapour distillation column to condense and distil one or more hydrocarbon fractions including a liquid hydrocarbon within a diesel boiling point range; and (iv) filtering the liquid hydrocarbon in the diesel boiling point range with a clay adsorbent material to remove particulates, contaminants, colour bodies, and odour.

In an embodiment, the method further comprises operating the vertical cylindrical reactor with a liquid hydrocarbon volume in the range of about 1.5 m$^3$ to about 5.0 m$^3$ (about 1500 L to 5000 L).

In another embodiment, the method further comprises operating the vertical cylindrical reactor at an operating temperature ranging from about 325° C. to about 425° C.

In another embodiment, the method further comprises operating the vertical cylindrical reactor at an operating pressure ranging from about 0 kPag to about −49 kPag.

In another embodiment, the method further comprises operating the vertical cylindrical reactor with an average nominal liquid residence time of about 0.5 hours to about 3.0 hours.

In another embodiment, the method further comprises pre-heating the dehydrated waste oil prior to thermal pyrolysis in the vertical cylindrical reactor. In another embodiment, the method further comprises condensing and distilling a heavy liquid hydrocarbon with a boiling point higher than the diesel boiling point range to be re-routed back into the vertical cylindrical reactor for further thermal pyrolysis.

In another embodiment, the method further comprises condensing and distilling a light liquid hydrocarbon with a boiling point lower than the diesel boiling point range to be used as a process fuel or a chemical product.

In another embodiment, filtering the liquid hydrocarbon comprises passing the liquid hydrocarbon through a regenerable filter bed of granulated clay contained within one or more filter units.

In another embodiment, the granulated clay is calcium bentonite or activated bauxite.

In another embodiment, the temperature of the liquid hydrocarbon during filtering is controlled in the range of about 35° C. to about 100° C.

In another embodiment, filtering the liquid hydrocarbon comprises: contacting the liquid hydrocarbon with the clay adsorbent material to remove the particulates, contaminants, colour bodies, and odour; and filtering the liquid hydrocarbon from the adsorbent material.

In another aspect, there is provided a system for re-refining petroleum-based waste oil to diesel fuel and petroleum products, comprising: means for dehydrating waste oil to remove free and emulsified water; means for operating a vertical cylindrical reactor to obtain a hydrocarbon vapour from thermal pyrolysis of the dehydrated waste oil; means for operating a hydrocarbon vapour distillation column to condense and distil one or more hydrocarbon fractions including a liquid hydrocarbon within a diesel boiling point range; and means for filtering the liquid hydrocarbon in the diesel boiling point range with a clay adsorbent material to remove particulates, contaminants, colour bodies, and odour.

In an embodiment, the system further comprises means for operating the vertical cylindrical reactor with a liquid hydrocarbon volume in the range of about 1.5 m3 to about 5.0 m3 (about 1500 L to 5000 L).

In another embodiment, the system further comprises means for operating the vertical cylindrical reactor at an operating temperature ranging from about 325° C. to about 425° C.

In another embodiment, the system further comprises means for operating the vertical cylindrical reactor at an operating pressure ranging from about 0 kPag to about −49 kPag.

In another embodiment, the system further comprises means for operating the vertical cylindrical reactor with an average nominal liquid residence time of about 0.5 hours to about 3.0 hours.

In another embodiment, the system further comprises means for pre-heating the dehydrated waste oil prior to thermal pyrolysis in the vertical cylindrical reactor.

In another embodiment, the system further comprises means for condensing and distilling a heavy liquid hydrocarbon with a boiling point higher than the diesel boiling point range to be re-routed back into the vertical cylindrical reactor for further thermal pyrolysis.

In another embodiment, the system further comprises means for condensing and distilling a light liquid hydrocarbon with a boiling point lower than the diesel boiling point range to be used as a process fuel or a chemical product.

In another embodiment, the system further comprises means for filtering the liquid hydrocarbon comprises a clarifying regenerable filter bed of granulated clay contained within one or more filter units.

In another embodiment, the granulated clay is calcium bentonite or activated bauxite.

In another embodiment, the temperature of the liquid hydrocarbon during filtering is controlled in the range of about 35° C. to about 100° C.

In another embodiment, the means for filtering the liquid hydrocarbon comprises: means for contacting the liquid hydrocarbon with the clay adsorbent material to remove the particulates, contaminants, colour bodies, and odour; and means for filtering the liquid hydrocarbon from the adsorbent material.

As noted above, the present invention relates to a micro scale reactor which is used for refining waste oil. In the present disclosure, "micro-scale" refers to a processing facility having a capacity to process anywhere between about 160 L to about 3,500 L of waste oil per hour.

Figure 5B:
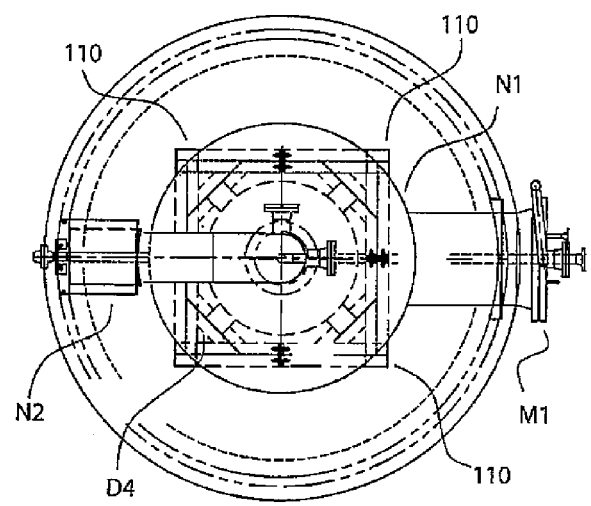
FIG. 5B shows a diagram of a preferred model of the present invention viewed from above.
Figure 5A:
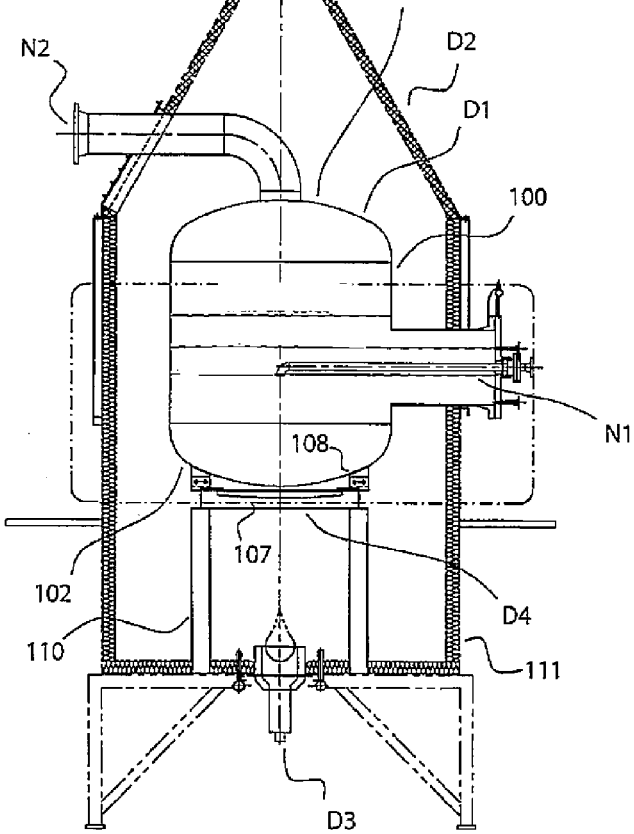
FIG. 5A shows a diagram of a preferred model of the present invention viewed horizontally.

In one embodiment, referring to FIG. 5A, the reactor consists of the vertical cylindrical reactor (D-1) forming a vertical cylindrical wall 100 with domed top 101 and bottom 102 heads and the furnace shell (D-2) with a range of 0.3 m to 0.5 m distance between them but with a preferred distance of 0.4 m. The domed ends are either elliptical or hemispherical.

Figure 6A:
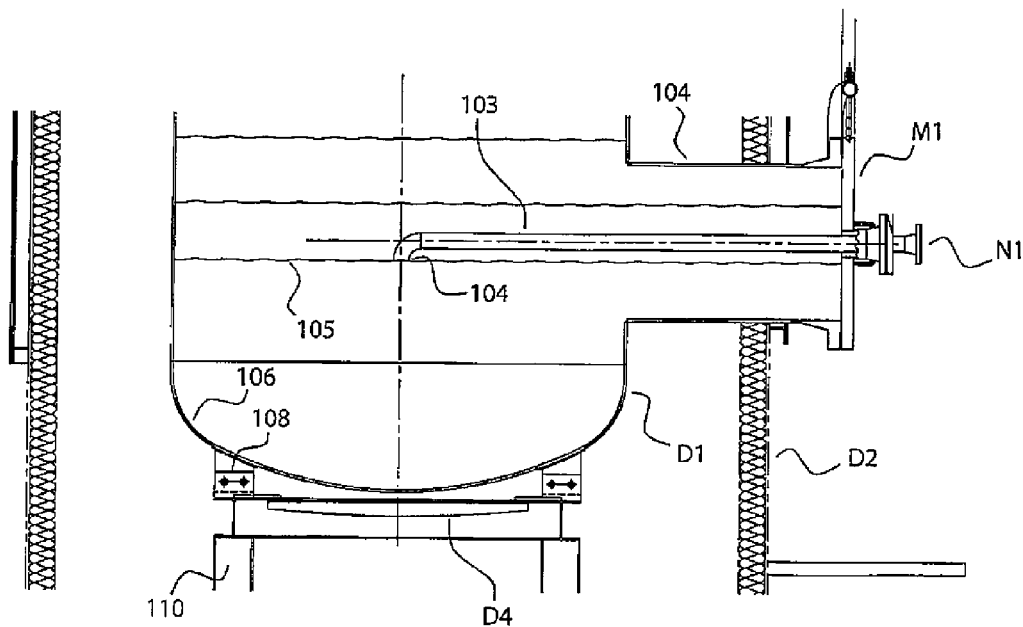
FIG. 6A shows a partial diagram of the vertical cylindrical reactor.

Waste oil is fed to the vertical cylindrical reactor (D-1) through inlet connection (N-1) also shown in FIG. 6A. The inlet supply N1 forms a pipe 103 extending into the reactor through a main opening 104 forming an inlet connection at one side of the vertical cylindrical reactor and discharging downwardly via a down turned nozzle 104 for continuously supplying petroleum-based waste oil in liquid form which fills part of the vertical cylindrical reactor up to a fill line 105. From the fill line downwardly the whole of the inside surface of the reactor is by the liquid.

The vertical cylindrical reactor (D-1) has an inside wall 106 which is exposed to the waste oil feedstock with no internal rotating device to either scrape material from the wall or help promote mixing in the vertical cylindrical reactor. The liquid in the bottom therefore cannot escape and is not mixed by any mechanical assistance. As shown, the inlet connection (N-1) continuously supplies waste oil into the vertical cylindrical reactor (D-1) FIG. 6A. The vertical cylindrical reactor has no bottom discharge so that the only discharge is through the vapor outlet.

Pyrolysis of waste oil occurs as a result of heat being applied to the vertical cylindrical reactor (D-1) through a burner mechanism (D-3) located at the bottom of the furnace shell (D-2). In this embodiment fired furnace shell (D-2) is of a vertical cylindrical design with a single or multiple bottom or side mounted burner systems. The vertical cylindrical reactor (D-1) is designed to induce pyrolysis of the waste oil.

In one embodiment furnace shell (D-2) is of a vertical cylindrical design with a single bottom mounted burner mechanism (D-3). In this illustrative example, burner mechanism (D-3) heats vertical cylindrical reactor (D-1) by distributing heat around heat deflector (D-4). The heat deflector (D-4) is situated within a range of 1.1 m to 1.8 m from the furnace bottom but preferably 1.4 m from the bottom. The heat deflector D4 is mounted to the vertical cylindrical reactor to facilitate dispersion of heat evenly in the furnace and around the vertical cylindrical reactor and control of heat intensity to the bottom. The heat deflector comprises a plate 107 located underneath the vertical cylindrical reactor. The heating system is located at a bottom wall of the shell and the plate 107 is mounted above on a support 108 attached to the bottom head of the vertical cylindrical reactor. In another example the plate 107 and the heat deflector (D-4) is mounted to and hanging from the domed bottom head 102. The reactor D1 is carried on support legs 110 carried from the flat bottom wall 111 of the shell with the burner (in this case one burner is shown) in between the legs underneath the plate.

Figure 6B:
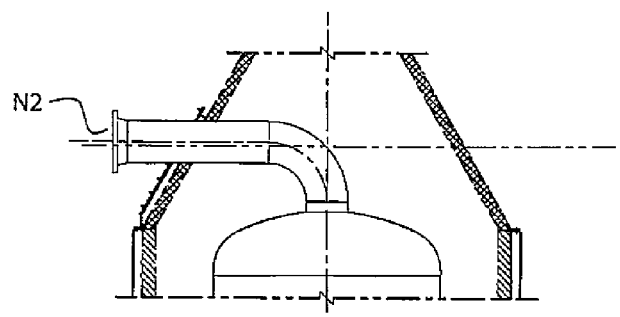
FIG. 6B shows a partial diagram of the furnace shell with the vapor outlet connection.

The waste oil in the vertical cylindrical reactor is heated to a range of approximately 325° C.-425° C., and more preferably 375° C.-415° C., while under a vacuum pressure ranging from 0 kPag to −49 kPag. These operating conditions facilitate the decomposition of hydrocarbon compounds in liquid phase into smaller hydrocarbon compounds that occur in vapour phase. In normal operation there is a need for a constant flow of waste oil into vertical cylindrical reactor (D-1) through inlet connection (N-1) because vaporised hydrocarbons exit vertical cylindrical reactor (D-1) through vapor outlet connection (N-2) shown in FIG. 6B. Thus the vertical cylindrical reactor is effectively operated in a continuous manner (constant inflow and outflow of hydrocarbons).

In another preferred embodiment the waste oil feedstock is preheated to a range of about 125° C. to about 350° C.—with a preferred range from about 250° C. to about 350° C. and a more preferred range of about 300° C. to about 350° C. to prepare the waste oil for optimum thermal cracking in vertical cylindrical reactor (D-1). The preferred embodiment outlined may utilize a number of types of dehydration methods that are suitable for the service. In this example a thermal dehydration method is utilized.

Again referring to FIG. 5A in an embodiment, vertical cylindrical reactor (D-1) is a cylindrical vessel with a height range of 1.8 m-3.0 m but a preferred height of 2.3 m and a diameter range of 1.4 m to 2.3 m but a preferred diameter of 1.8 m. In another embodiment, the vertical cylindrical reactor is vessel with standard dished heads that may operate with a volume of liquid hydrocarbon ranging from about 1.5 $m^3$ to about 5.0 $m^3$ (about 1,500 L to 5,000 L), with a preferred range from about 2.0 $m^3$ to about 4.0 $m^3$ (about 2,000 L to 4,000 L) and a more preferred range of about 2.0 $m^3$ to about 3.5 $m^3$ (about 2,000 L to 3,500 L).

In an embodiment, furnace shell (D-2) is of a vertical cylindrical design with a cone shaped head with a height ranging from 4.2 m to 7.1 m but a preferred height of 5.5 m and a diameter range of 2.2 m to 3.8 m and a preferred diameter of 2.9 m. A vapor stack is connected to the top of the furnace's cone to allow flue gas to exit furnace shell (D-2). There exists a burner mechanism (D-3) mounted at the bottom of furnace shell (D-2) controlled either individually or in conjunction with the fuel supply system, manually or by a burner management system. In another embodiment, furnace shell (D-2) can be of a cabin or box type fired heater. In another embodiment, furnace shell (D-2) can have a plurality of floor and/or wall mounted burners. In another embodiment the multiple burners are controlled either individually or in conjunction with the fuel supply system, manually or by a burner management system.

In an embodiment, vertical cylindrical reactor (D-1) operates in sub-atmospheric conditions of about 0 kPag to about −49 kPag, with a preferred range of about 0 kPag to about −35 kPag and a more preferred range of about −7 kPag to about −21 kPag, heated to a range of about 325° C. to about 425° C., with a preferred range from about 375° C. to about 415° C. and a more preferred range of about 400° C. to about 410° C.

Under the reaction conditions described, liquid hydrocarbons have an average nominal liquid residence time in the vertical cylindrical reactor (D-1) of 0.5 hours to about 3.0 hours, with a preferred range from about 0.5 hours to about 2.0 hours and a more preferred range of about 0.75 hours to about 1.75 hours based on the liquid feed volume in vertical cylindrical reactor (D-1). While inside the vertical cylindrical reactor (D-1) the hydrocarbons undergo mild cracking reactions that reduce the size of the hydrocarbon molecules so that most of the resulting molecules have a boiling point in the diesel fuel range. Once the feed molecules have been cracked into the lighter molecules, the lighter molecules in vapour phase exit the reactor through the vapour outlet connection (N-2). The continuous addition of waste oil ensures that a constant level is maintained within the vertical cylindrical reactor (D-1). The mild operating conditions of temperature and pressure help ensure high selectivity to desired products.

Figure 6C:
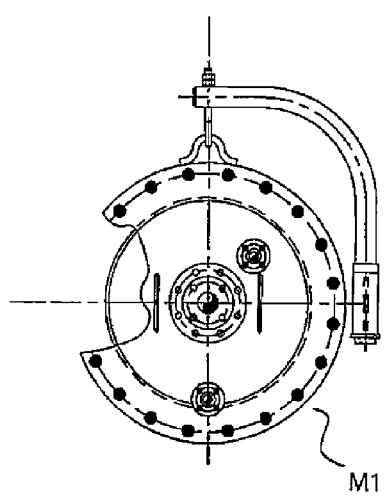
FIG. 6C shows a diagram of the manway viewed horizontally.

In addition to the high selectivity, the mild conditions and relatively low heat flux rate from burner (D-3) into the vertical cylindrical reactor (D-1) ensures that the bulk fluid temperature as well as the reactor wall temperature remain low enough to minimize coke formation without having to withdraw any sludge and/or heavy liquid and/or liquid/solid streams from the reactor to facilitate long term (1-12 months depending on feedstock quality and operating conditions) continuous operation. If any coke is formed due to operation over a long period, coke that forms on the inside of the vertical cylindrical reactor walls can easily be removed by mechanical means such as physical scraping and/or sand blasting and/or water blasting after the reactor is drained, cooled and purged during routine maintenance. All internal surfaces of vertical cylindrical reactor (D-1) are easily accessed via a manway (M-1) for cleaning as shown in FIGS. 6A and 6C.

In an embodiment, after undergoing pyrolysis, cracked hydrocarbons leave vertical cylindrical reactor (D-1) as vapour through outlet connection (N-2). The final resulting vapour can be used to transfer thermal energy to any pre-heater and may serve to increase the thermal efficiency of the process. The vapour exits the reactor and can remain completely in the vapour phase or be partially condensed. It will be appreciated the vaporised hydrocarbons will be further separated to purify the diesel product. It will be further appreciated that in one embodiment heavy hydrocarbons recovered from further separation can be recycled back to the vertical cylindrical reactor (D-1).

In an embodiment, the device further comprises operating the vertical cylindrical reactor with a liquid hydrocarbon volume in the range of about 1.5 m³ to about 5.0 m³ (about 1,500 L to 5,000 L).

In another embodiment, the device further comprises operating the vertical cylindrical reactor at an operating temperature ranging from about 325° C. to about 425° C.

In another embodiment, the device further comprises operating the vertical cylindrical reactor at an operating pressure ranging from about 0 kPag to about −49 kPag.

In another embodiment, the device further comprises operating the vertical cylindrical reactor with an average nominal liquid residence time of about 0.5 hours to about 3.0 hours.

In another embodiment, the device further comprises pre-heating and/or dehydrating the waste oil prior to pyrolysis in the vertical cylindrical reactor.

While illustrative embodiments have been described above by way of example, it will be appreciated that various changes and modifications may be made without departing from the scope of the invention, which is defined by the following claims.

The invention claimed is:

1. A method for refining petroleum based waste oil to diesel fuel and products comprising:
   (i) dehydrating waste oil to remove free and emulsified water;
   (ii) operating a vertical cylindrical reactor to obtain a hydrocarbon vapour from pyrolysis of the dehydrated waste oil;
   (iii) operating a hydrocarbon vapour distillation column to condense and distil one or more hydrocarbon fractions including a liquid hydrocarbon within a diesel boiling point range; and
   (iv) filtering the liquid hydrocarbon in the diesel boiling point range with a regenerable adsorbent material to remove particulates, contaminants, colour bodies, and odour;
   wherein the vertical cylindrical reactor is heated by an exterior heating system which includes a heat deflector mounted to the vertical cylindrical reactor which acts to disperse heat evenly around the vertical cylindrical reactor and to control heat intensity to a bottom of the vertical cylindrical reactor.

2. The method according to claim 1, further comprising operating the vertical cylindrical reactor at an operating vacuum pressure below atmospheric pressure ranging from about 0 kPag to about −49 kPag.

3. The method according to claim 1, further comprising arranging the rate of continuous in flow of feed of the waste oil relative to the volume of material in the vertical cylindrical reactor to cause operating the vertical cylindrical reactor with an average nominal liquid residence time of about 0.5 hours to about 3.0 hours.

4. The method according to claim 1, further comprising pre-heating the dehydrated waste oil to a temperature in the range about 300° C. to 350° C. prior to pyrolysis in the vertical cylindrical reactor.

5. The method according to claim 1, further comprising condensing and distilling in the distillation column a heavy liquid hydrocarbon with a boiling point higher than the diesel boiling point range and re-routing the heavy liquid hydrocarbon back into feed material into the vertical cylindrical reactor for further pyrolysis.

6. The method according to claim 5, wherein the heavy hydrocarbons that do not meet the required diesel boiling point range travel downward in the distillation column and are diverted by a fractionation bottoms pump back to vertical cylindrical reactor feed stream for reprocessing in the vertical cylindrical reactor so that only those hydrocarbon compounds that require additional thermal pyrolysis are subjected to further treatment in the vertical cylindrical reactor.

7. The method according to claim 1, further comprising condensing and distilling a light liquid hydrocarbon with a boiling point lower than the diesel boiling point range to be used as a process fuel or a chemical product.

8. The method according to claim 1, wherein the distillation column comprises a distillation tower which is not integrally connected to the vertical cylindrical reactor.

9. The method according to claim 1, wherein the heat deflector comprises a plate located underneath the vertical cylindrical reactor.

10. The method according to claim 9, wherein the exterior heating system includes an exterior shell surrounding the vertical cylindrical reactor and at least one burner located at a bottom of the shell and wherein the plate is mounted above said at least one burner on a support attached to a bottom of the vertical cylindrical reactor.

11. The method according to claim 1, wherein the reactor has an upstanding cylindrical wall and domed top and bottom ends.

12. The method according to claim 1, wherein the vertical cylindrical reactor has an inside wall which is exposed to the interior with no internal rotating device to either scrape material from the wall or help promote mixing in the vertical cylindrical reactor.

13. The method according to claim 1, wherein a rate of continuous in flow of feed of the waste oil relative to the volume of material in the vertical cylindrical reactor is arranged so as to provide a constant or substantially constant level of liquid in the vertical cylindrical reactor.

14. The method according to claim 10, wherein the shell surrounding the reactor is in the range of five to eight inch castable refractory.

15. A method for refining petroleum based waste oil to diesel fuel and products comprising:
 (i) Dehydrating waste oil to remove free and emulsified water;
 (ii) operating a thermal kettle reactor to obtain a hydrocarbon vapour from thermal pyrolysis of the dehydrated waste oil;
 (iii) operating a hydrocarbon vapour distillation column to condense and distil one or more hydrocarbon fractions including a liquid hydrocarbon within a diesel boiling point range; and
 (iv) filtering the liquid hydrocarbon in the diesel boiling point range with an adsorbent material to remove particulates, contaminants, colour bodies, and odour;
 wherein the thermal kettle reactor is operated at temperatures ranging from about 325° C. to about 425° C. and at vacuum pressures ranging from about 0 kPag to about −35 kPag;
 and wherein the thermal kettle reactor is operated so as to reduce coke formation to avoid withdrawing any sludge and/or heavy liquid and/or liquid/solid streams from the bottom of the reactor.

16. A method for refining petroleum based waste oil to diesel fuel and products comprising:
 (i) Dehydrating waste oil to remove free and emulsified water;
 (ii) operating a thermal kettle reactor to obtain a hydrocarbon vapour from thermal pyrolysis of the dehydrated waste oil;
 (iii) operating a hydrocarbon vapour distillation column to condense and distil one or more hydrocarbon fractions including a liquid hydrocarbon within a diesel boiling point range; and
 (iv) filtering the liquid hydrocarbon in the diesel boiling point range with an adsorbent material to remove particulates, contaminants, colour bodies, and odour;
 wherein the thermal kettle reactor is operated at temperatures ranging from about 325° C. to about 425° C. and at vacuum pressures ranging from about 0 kPag to about −35 kPag;
 wherein a rate of continuous in flow of feed of the waste oil relative to the volume of material in the reactor is controlled to cause operating the thermal kettle reactor with an average nominal liquid residence time of about 0.5 hours to about 3.0 hours;
 and wherein the thermal kettle reactor is operated so as to reduce coke formation to avoid withdrawing any sludge and/or heavy liquid and/or liquid/solid streams from the bottom of the reactor.

17. A method for refining petroleum based waste oil to diesel fuel and products comprising:
 (i) Dehydrating waste oil to remove free and emulsified water;
 (ii) operating a thermal kettle reactor to obtain a hydrocarbon vapour from thermal pyrolysis of the dehydrated waste oil;
 (iii) operating a hydrocarbon vapour distillation column to condense and distil one or more hydrocarbon fractions including a liquid hydrocarbon within a diesel boiling point range; and
 (iv) filtering the liquid hydrocarbon in the diesel boiling point range with an adsorbent material to remove particulates, contaminants, colour bodies, and odour;
 wherein the thermal kettle reactor is operated at temperatures ranging from about 325° C. to about 425° C. and at vacuum pressures ranging from about 0 kPag to about −35 kPag;
 wherein a rate of continuous in flow of feed of the waste oil relative to the volume of material in the reactor is controlled to cause operating the thermal kettle reactor with an average nominal liquid residence time of about 0.5 hours to about 3.0 hours;
 wherein the thermal kettle reactor is heated by an exterior heating system which includes a heat deflector which acts to disperse heat evenly around the thermal kettle reactor and to control heat intensity to a bottom of the thermal kettle reactor.

18. The method according to claim 17, wherein the heat deflector comprises a plate located underneath the thermal kettle reactor.

19. The method according to claim 17, wherein the heating system includes an exterior shell surrounding the thermal kettle reactor and at least one burner located at a bottom wall of the exterior shell and wherein the plate is mounted in said shell above said at least one burner.

20. The method according to claim 17, wherein the thermal kettle reactor has an upstanding cylindrical wall and domed top and bottom ends.

21. A method for refining petroleum based waste oil to diesel fuel and products comprising:
 (i) Dehydrating waste oil to remove free and emulsified water;
 (ii) operating a thermal kettle reactor to obtain a hydrocarbon vapour from thermal pyrolysis of the dehydrated waste oil;
 (iii) operating a hydrocarbon vapour distillation column to condense and distil one or more hydrocarbon fractions including a liquid hydrocarbon within a diesel boiling point range; and
 (iv) filtering the liquid hydrocarbon in the diesel boiling point range with an adsorbent material to remove particulates, contaminants, colour bodies, and odour;
 wherein the thermal kettle reactor is heated by an exterior heating system;
 wherein the exterior heating system includes an exterior shell surrounding the thermal kettle reactor and at least one burner located at a bottom of the exterior shell;
 wherein the exterior heating system includes a heat deflector plate mounted in said shell above said at least one burner which acts to disperse heat evenly around the thermal kettle reactor and to control heat intensity to a bottom of the thermal kettle reactor.

22. The method according to claim 21, wherein the thermal kettle reactor is operated at temperatures ranging from about 325° C. to about 425° C. and at vacuum pressures ranging from about 0 kPag to about −35 kPag.

23. The method according to claim 21, wherein a rate of continuous in flow of feed of the waste oil relative to the volume of material in the reactor is controlled to cause operating the thermal kettle reactor with an average nominal liquid residence time of about 0.5 hours to about 3.0 hours.

24. The method according to claim 22, wherein a rate of continuous in flow of feed of the waste oil relative to the volume of material in the reactor is controlled to cause operating the thermal kettle reactor with an average nominal liquid residence time of about 0.5 hours to about 3.0 hours.

\* \* \* \* \*